(12) United States Patent
Gallo et al.

(10) Patent No.: US 7,665,115 B2
(45) Date of Patent: Feb. 16, 2010

(54) INTEGRATION OF MEDIA PLAYBACK COMPONENTS WITH AN INDEPENDENT TIMING SPECIFICATION

(75) Inventors: Kevin T. Gallo, Woodinville, WA (US); Paul C. David, Kirkland, WA (US); Dorin O. Ungureanu, Redmond, WA (US); Debbie A. Newman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 929 days.

(21) Appl. No.: 09/776,375

(22) Filed: Feb. 2, 2001

(65) Prior Publication Data

US 2002/0161797 A1    Oct. 31, 2002

(51) Int. Cl.
*H04N 7/173* (2006.01)
*G06F 15/16* (2006.01)
*G06F 3/00* (2006.01)
*G06F 9/44* (2006.01)
*G06F 9/46* (2006.01)
*G06F 13/00* (2006.01)

(52) U.S. Cl. .................. 725/110; 709/205; 709/237; 709/231; 725/87; 725/88; 719/311; 719/313; 719/328; 719/329

(58) Field of Classification Search ............ 719/311, 719/329, 313, 328; 725/88, 87, 110; 709/205, 709/231, 237
See application file for complete search history.

(56) References Cited

U.S. PATENT DOCUMENTS

| | | | | |
|---|---|---|---|---|
| 5,754,774 A | * | 5/1998 | Bittinger et al. | 709/203 |
| 6,188,398 B1 | * | 2/2001 | Collins-Rector et al. | 725/37 |
| 6,269,122 B1 | * | 7/2001 | Prasad et al. | 375/240.28 |
| 6,654,933 B1 | * | 11/2003 | Abbott et al. | 715/513 |
| 6,677,964 B1 | * | 1/2004 | Nason et al. | 715/764 |
| 6,701,383 B1 | * | 3/2004 | Wallace et al. | 719/328 |
| 6,834,371 B1 | * | 12/2004 | Jensen et al. | 715/500.1 |
| 7,171,448 B1 | * | 1/2007 | Danielsen et al. | 709/205 |
| 2002/0112247 A1 | * | 8/2002 | Horner et al. | 725/112 |

* cited by examiner

*Primary Examiner*—Joseph G Ustaris
*Assistant Examiner*—Sumaiya A Chowdhury

(57) ABSTRACT

A software framework that allows seamless integration of generic media players into a web browser. A media player is a software module that implements specific interfaces; defines a playing state, such as playing, paused, or stopped; and associates with the playing state a current playback time. A generic media player implements interfaces, including timing interfaces and playback synchronization interfaces for exchanging timing and synchronization information with a web browser. A player-hosting peer, which is a software component built into the browser, manages generic player hosting by a web browser. The player-hosting peer negotiates playback state and rendering status between the browser and the media player. Both the media player and the player-hosting peer maintain playing state and current playback time. The relationship between the peer and the player is a master slave relationship, with the peer being the master. The peer issues commands to the player, and the player notifies the peer of any state changes. A proxy layer allows external media players to integrate seamlessly into a browser.

53 Claims, 6 Drawing Sheets

| Player Peer State | Player State |
|---|---|
| Inactive | No source |
| Active | Playing, Seeking, Media Done |
| Waiting for download | Playing |
| Out of sync | Playing |

Figure 5

| Command or Event | Initiated by | Comment |
|---|---|---|
| Media cued | Player | Occurs when media is ready for playback. |
| Deactivate | Browser | The player should prepare for destruction. |
| Change source | Browser | Change media source. |
| Buffer Empty | Player | Playback cannot continue due to media delivery problems. |
| Buffer Full | Player | Delivery problems have been resolved and playback can continue. |
| Sync lost | Peer | Media playback time is out of sync with the peer time. |
| Sync recovered | Peer | Media playback time is in sync with the peer time. |
| Playback commands (Play, Stop, Pause, Resume, Seek) | Browser | Except for Seek, all these commands have essentially no effect on the peer state and are passed through to the player. The commands may be defined as follows: Play, start playback; Stop, finish playback; Pause, temporarily suspend playback; Resume, resume suspended playback and Seek, jump to another time offset in the playback. |

Figure 6

INTEGRATION OF MEDIA PLAYBACK COMPONENTS WITH AN INDEPENDENT TIMING SPECIFICATION

TECHNICAL FIELD

The present invention relates generally to media player hosting by a web browser. More particularly, the invention provides a system and method for integrating generic media playback components into a web browser and for negotiating playback state and rendering status between the browser and the media player.

BACKGROUND OF THE INVENTION

Conventional Internet browsers were designed mainly as text layout engines. Such browsers, therefore, are typically very limited in the ways in which they deliver multimedia content. As broadband Internet access becomes more widely available, however, multimedia playback of content, including, but not limited to video content and audio content, will become an increasingly important feature that an Internet browser should provide.

Conventionally, upon encountering an embedded multimedia object, a browser merely provides a rendering area and does not stay involved with communicating timing information to a media player or passing synchronization information between a media player and other types of content. Instead, with respect to timing, the media player is essentially autonomous once it has been instantiated, and provided a rendering area, from a browser.

Accordingly, there is a need in the prior art for increased communication between media players and browsers such that a browser is capable of knowing when a player has finished downloading content, when the player is ready to playback content, what the player's time rate is, and the like. In addition, there is a need in the prior art for allowing a browser to be capable of causing a media player to perform various timing and synchronization-related operations, including, but not limited to commanding the player to start, stop, and pause playback, and to speed up and/or slow down media playback in accordance with any elements with which a media player's playback is to be synchronized. There is also a need in the prior art for seamlessly integrating content from various disparate sources, which may require various disparate media players, in accordance with a generic set of interfaces for exchanging information, including, but not limited to, timing and synchronization information, between browsers and media players.

Accordingly, there is a need in the prior art for techniques that enable generic multimedia hosting by Internet browsers, whereby the browser becomes an improved platform for delivering media rich content in conjunction with text content, thereby allowing for a tighter integration of multimedia content into web content.

SUMMARY OF THE INVENTION

A system and method in accordance with certain inventive principles overcomes the foregoing shortcomings of the relatively limited interaction, and lack of exchange of timing and synchronization information, between prior art browsers and media players.

In accordance with certain inventive principles, a software framework is provided that allows seamless integration of third party media players into a web browser. A media player includes, but is not limited to, a software module that implements any of various interfaces in accordance with the teachings of this invention.

In accordance with the principles of the invention, a software architecture is provided that allows an Internet browser to host a generic media player. A "media player" may be any software component that defines a playing state, such as playing, paused, stopped, and the like, and associates with that playing state a current playback time. The current playback time may be the time offset into the media at which the player is currently playing.

Various inventive principles include a generic description of a media player and provision of one or more of the following services to media players: layout and composition of the rendering area the player renders to; scheduling of downloads and presentation times; and synchronization of media playback with a timing representation provided by the browser. These services make web browsing a more robust and versatile medium for multimedia delivery.

In accordance with certain inventive principles, techniques are provided for allowing integration of any media player that supports certain specifics, which have been integrated into a web browser's rendering architecture and timing architecture. According to various aspects of the invention, a mechanism is provided for dynamically adjusting the rate of timing flow between different playback components.

In accordance with certain inventive principles, a media player preferably implements various interfaces, including, but not limited to the following types of interfaces, which are described in more detail below: player lifetime management interface; timing interfaces, which may be used to exchange timing information between content, the media player, and a browser hosting the player; playback control interfaces, which may be used to control media playback; rendering interfaces, which may be used by rendering media players to render media content; and playback synchronization interfaces, which may be used to communicate timing information between a media player and a web browser. While the player lifetime management interfaces, playback control interfaces, and rendering interfaces are generally directed toward object management, the timing interfaces and playback synchronization interfaces allow for timing synchronization of multimedia content.

As described in more detail below, under certain circumstances, the playback synchronization interfaces may allow a host computer to provide timing information to content present in an HTML page. These interfaces provide methods that allow multiple media players present on a page to synchronize with each other or with other timed content.

In accordance with certain inventive principles, media player hosting is managed by a component, referred to as a player-hosting peer, which will typically be implemented in software and built into a web browser. The peer preferably negotiates playback state and rendering status between the browser and the player. The player-hosting peer and media player preferably perform state transitions described in detail below to keep a web browser and one or more media players coordinated and synchronized while displaying or rendering multiple potentially disparate types of content that may be incorporated into a single document.

In accordance with various inventive principles, communication channels for informing media playback components about a browser's timing infrastructure are provided. A web content author may use different embeddable playback components, each having different notions of time, within a single document at the author's discretion.

According to certain inventive aspects, an infrastructure, referred to as a proxy layer or integration layer, is provided that underlies, and allows extensibility of, various elements set forth in the working draft of the SMIL 2.0 Timing and Synchronization Module. The working draft of the SMIL 2.0 Timing and Synchronization Module discusses in detail the use of special temporal models, including, for instance, the expected consequences of declarations, such as sync master and other synchronization behaviors. A media player may be either native to a browser or may be an external media player. An external media player is advantageously able to integrate seamlessly into a browser by implementing certain interfaces in accordance with various principles of the invention. The proxy layer extends the timing and synchronization functionality existing in the context of a browser and native media player to the context of a browser and a media player that is external to the browser.

Additional features and advantages of the invention will be apparent upon reviewing the following detailed description.

BRIEF DESCRIPTION OF THE DRAWINGS

FIG. 5 is a table showing correspondence between various player-hosting peer states and media player states.

FIG. 6 is a table providing a description of various commands and events that may trigger player-hosting peer state changes.

DETAILED DESCRIPTION OF THE INVENTION

Introduction

Figure 1:
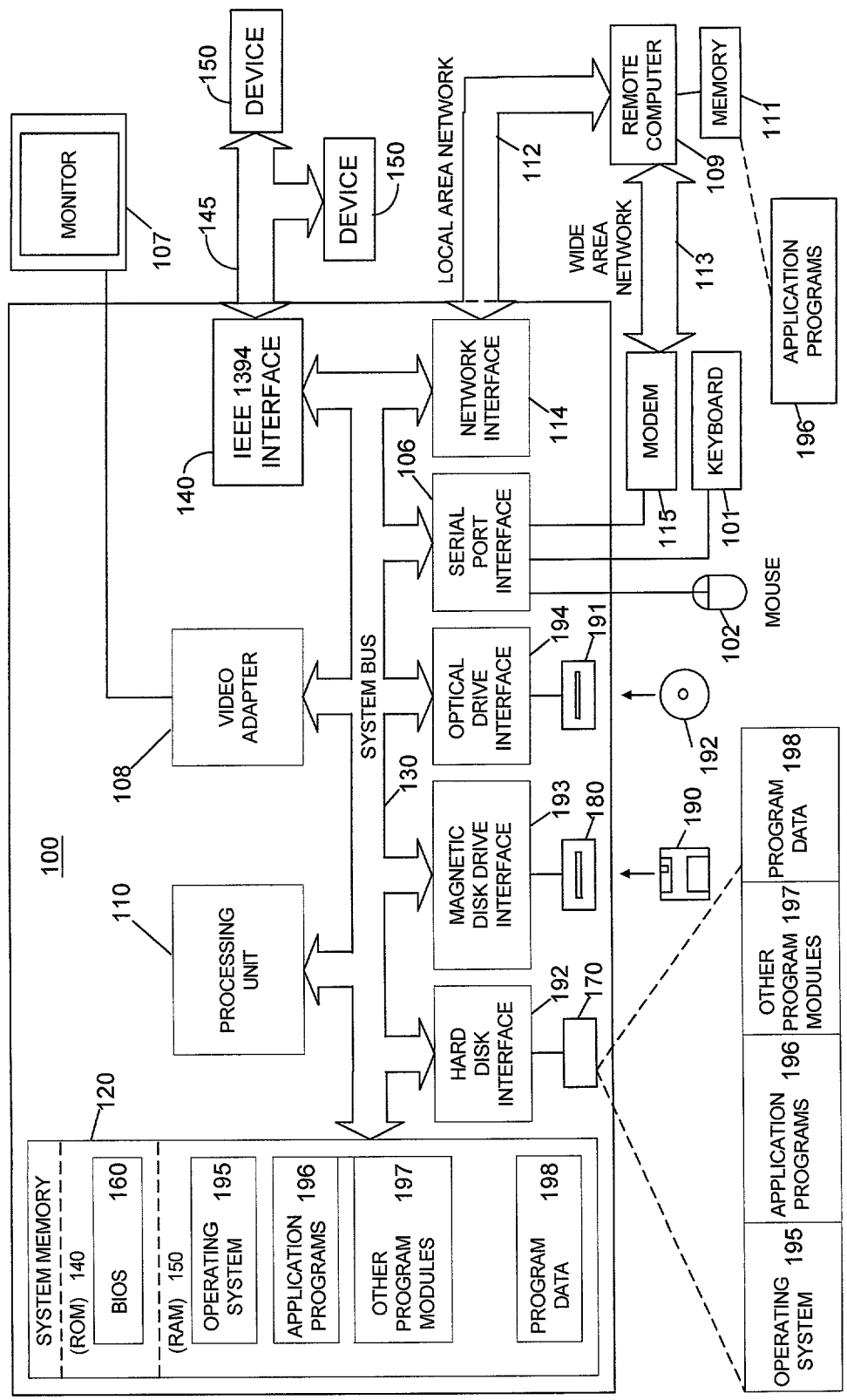
FIG. 1 is a schematic block diagram of a conventional general-purpose digital computing environment that can be used to implement various aspects of the present invention.

In accordance with certain inventive principles, a software framework is provided that allows for seamless integration of media players into a web browser. A media player includes, but is not limited to, a software module that implements any of various interfaces described below. Various inventive principles include a generic description of a media player and provision of one or more of the following services to media players: layout and composition of the rendering area the player renders to; scheduling of downloads and presentation times; and synchronization of media playback with a timing representation provided by the browser. These services make web browsing a more versatile medium for multimedia delivery.

In accordance with certain inventive principles, techniques are provided for allowing integration of any media player that supports certain specifics that have been integrated into a web browser's rendering architecture and timing architecture.

Conventional views of content historically have been that the media itself is self-contained such that everything that is part of the presentation is part of the single component. In accordance with certain principles of this invention, a more open view of content is provided to allow a richer type of integration and communication to occur between one or more media streams, playback components, and/or other system components. Accordingly, integration may occur between various disparate types of content such as simple text content and one or more disparate corresponding media players.

According to an aspect of the invention, a mechanism is provided for dynamically adjusting the rate of timing flow between different playback components.

In the web community, taking information and raw content from other sources and aggregating the information and/or raw content is becoming increasingly popular. In some circumstances, entities that re-package the information have rights to distribute the content, but not to modify the content itself. Under these circumstances, the ability to seamlessly integrate such content with other content and to tailor the integrated content to a re-packager's desires takes on increased importance. Accordingly, there is a need in the prior art for improved techniques for allowing seamless repackaging and re-purposing of such information.

For instance, specific types of media streams may have triggers embedded in them. These constructs are typically used in advertising. HTML content may be synchronized with particular events in media content. For instance, advertisements, in the form of HTML content, may be synchronized with multimedia content such as products shown in a movie. An HTML advertisement may be displayed next to a movie during the portion of the movie that shows the advertised product. The advertisement may include a link allowing a user to obtain information about the product and/or to purchase the product. A web-page author could specify in HTML that the media content should pause automatically upon a user following a link in such an advertisement. Such an integration of multimedia content, in the form of video content, may be used to particular advantage in the context of a web browser running in a cable television set top environment, for instance. In such a context, a browser may be used as a viewer for selecting movies, television shows, pay-per-view events, and the like, using an Internet back channel.

Another example of integrating multimedia content is combining the slides of a "POWERPOINT" graphics program presentation with recorded video of a presentation based on the "POWERPOINT" program slides. The slides may be synchronized to specific moments in the presentation to which the slides correspond. These two types of content may be integrated on a single page and played back in synchronization by a video player and a "POWERPOINT" player in accordance with the teachings of this invention.

Conventional General-Purpose Digital-Computing Environment

FIG. 1 is a schematic diagram of a conventional general-purpose digital-computing environment that can be used to implement various aspects of the present invention. A computer 100 includes a processing unit 110, a system memory 120 and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes a read only memory (ROM) 140 and a random access memory (RAM) 150.

A basic input/output system (BIOS) 160 containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. Hard disk drive 170, magnetic disk drive 180, and optical disk drive 191 are respectively connected to the system bus 130 by a hard disk drive interface 192, a magnetic disk drive interface 193, and an optical disk drive interface 194. The drives and their associated computer-readable media provide nonvolatile storage of computer readable instructions, data structures, program modules and other data for the computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. In particular, the RAM 150 will, from time to time, store various device drivers, as known in the art. A user can enter commands and information into computer 100 through input or selection devices, such as a keyboard 101 and a pointing device 102. The pointing device 102 may comprise a mouse, touch pad, touch screen, voice control and activation or other similar devices. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, a game port or a universal serial bus (USB). A monitor 107 or other type of display device is also connected to system bus 130 via an interface, such as a video adapter 108. In addition to the monitor, personal computers typically include other peripheral output devices (not shown), such as speakers and printers.

An IEEE 1394 interface 140 may also be provided. The IEEE 1394 interface 140 couples an IEEE 1394-compliant serial bus 145 to the system bus 130 or similar communication bus. The IEEE 1394-compliant serial bus 145, as known in the art, allows multiple devices 150 to communicate with the computer 100 and each other using high-speed serial channels. The IEEE 1394 serial bus standard is based largely upon the internationally adopted ISO/IEC 13213 (ANSI/IEEE 1212) CSR Architecture Specification and the IEEE 1394-1995 Serial Bus Specification, the teachings of which are herein incorporated by reference. Additional buses such as the PCI bus can be provided in computer 100 and interfaced to the IEEE 1394 and other buses.

A typical serial bus having an IEEE 1394 standard architecture is comprised of a multiplicity of nodes that are interconnected via point-to-point links, such as cables, that each connect a single node of the serial bus to another node of the serial bus. The nodes themselves are addressable entities that can be independently reset and identified. Nodes are logical entities, each with a unique address. Each node provides a so-called configuration ROM (read-only memory)—hereinafter referred to as configuration memory—and a standardized set of control registers that can be accessed by software residing within the computer system.

The computer 100 can operate in a networked environment using logical connections to one or more remote computers, such as a remote computer 109. The remote computer 109 typically includes at least some of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to local network 112 through a network interface or adapter 114. When used in a WAN networking environment, the computer 100 and remote computer 109 may both include a modem 115 or other means for establishing a communications over wide area network 113, such as the Internet. The modem 115, which may be internal or external, is connected to system bus 130 via the serial port interface 106. In a networked environment, program modules depicted relative to the computer 100, or portions thereof, may be stored in the remote memory storage device.

It will be appreciated that the network connections shown are exemplary and other means of establishing a communications link between the computers can be used. The existence of any of various well-known protocols, such as TCP/IP, "ETHERNET", FTP, HTTP and the like, is presumed, and the system can be operated in a client-server configuration to permit a user to retrieve web pages from a web-based server. Procedures of the present invention to be described below can operate within the environment of the computer 100 shown in FIG. 1. Although the invention is generally applicable to a computer operating in accordance with the IEEE 1394 standard, it is not intended to be so limited.

Media Players Generally

In accordance with the principles of the invention, a software architecture is provided that allows an Internet browser to host a generic media player. A "media player" may be any software component that defines a playing state, such as playing, paused, stopped, and the like, and associates with that playing state a current playback time. The current playback time may be the time offset into the media at which the player is currently playing.

A media player may be either a rendering media player or a non-rendering media player. Rendering players are players that typically draw or display media content to a display or screen area. Non-rendering players typically do not display media content to such a screen area. An audio player, for instance, is an example of a non-rendering media player.

A media player may also be either native to a browser or may be an external media player. An external media player may also be referred to as a third-party media player. Such external or third-party media players are advantageously able to integrate seamlessly into a browser by implementing interfaces in accordance with various principles of the invention. Generally, most concepts discussed below are phrased in terms of media players, not specifically native players versus external players. If the term media player is used without the terms "native," "external," or "third-party," then the concepts being discussed generally apply to both types of media players, that is, both native media players and external/third-party media players. The proxy layer, also referred to as the integration layer, generally applies to external media players. The proxy layer extends the timing and synchronization functionality existing in the context of a browser and a native media player to the context of a browser and an external third-party media player.

Media Player Interfaces

In accordance with certain inventive principles, a media player preferably implements various interfaces, including, but not limited to the following types of interfaces, which are described in more detail below: player lifetime management interface; timing interfaces, which may be used to exchange timing information between content, the media player, and a browser hosting the player; playback control interfaces, which may be used to control media playback; rendering interfaces, which may be used by rendering media players to render media content; and playback synchronization interfaces, which may be used to communicate timing information between a media player and a browser. While the player lifetime management interfaces, playback control interfaces, and rendering interfaces are generally directed toward object management, the timing interfaces and playback synchronization interfaces allow for improved synchronization of multimedia content. As will be apparent, although the plural term "interfaces" is used throughout this document, this term may refer to one or more interfaces without departing from the scope and spirit of the present invention.

The player lifetime management interfaces may be used to manage media player components. For instance, these interfaces may contain methods that are used to create and/or destroy a media player. Methods that facilitate the negotiation of services required by the player may also be provided within these interfaces.

The timing interfaces may provide methods that expose and control timing specific states defined by a media player. These may include methods that retrieve a player's current playback time.

Media playback may be controlled through the playback control interfaces. Generally stated, a player may be started, stopped, paused, resumed, or seeked to a given time offset. The player may inform the host of its playback capabilities through a set of capabilities methods.

The rendering interfaces may define methods used to set up various rendering mechanisms negotiated with the media player component by a host computer.

As described in more detail below, under certain circumstances, the playback synchronization interfaces may allow a host computer to provide timing information to content present in an HTML page. These interfaces provide methods that allow multiple media players present on a page to synchronize with each other or with other timed content.

Types of Player Hosting

Player hosting may be non-scheduled, scheduled, or synchronized. Non-scheduled hosting will typically be triggered by user interaction or some other host-initiated event and will typically have the player starting playback as soon as the player's media downloads. One example of this type of scenario already implemented by existing browsers is an animated .gif, which plays back as soon as it loads. In accordance with certain inventive principles, any type of media content may be hosted in a similar manner.

In a scheduled hosting scheme, media playback may be scheduled to begin at a time provided by a web content author. The media is preferably preloaded in an attempt to minimize the effect that download times have on the overall behavior of timed web content.

In a synchronized scheme, constraints are typically imposed on time relationships that exist between different timed content present on the same web page.

Player-Hosting Peer

Figure 2:
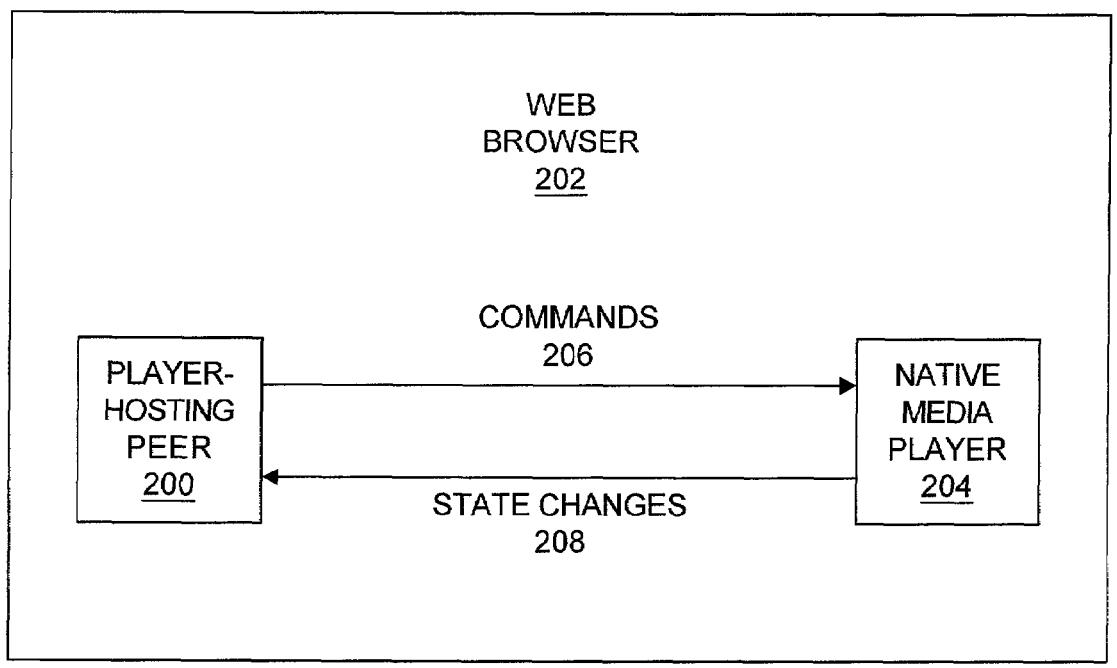
FIG. 2 is a simplified block diagram showing a web browser, a native media player, and a player-hosting peer in accordance with various inventive principles.

Referring to FIG. 2, in accordance with certain inventive principles, media player hosting is managed by a component, referred to as a player-hosting peer 200, which will typically be implemented in software and built into a web browser 202.

The peer preferably negotiates playback state and rendering status between the browser 202 and the player 204. Both the player and its peer preferably maintain playing state and current playback time. The relationship between the peer and the player is preferably a master slave relationship, with the peer being the master. The peer may issue commands 206 to the player, while the player may notify the peer of any state changes 208.

Figure 3:
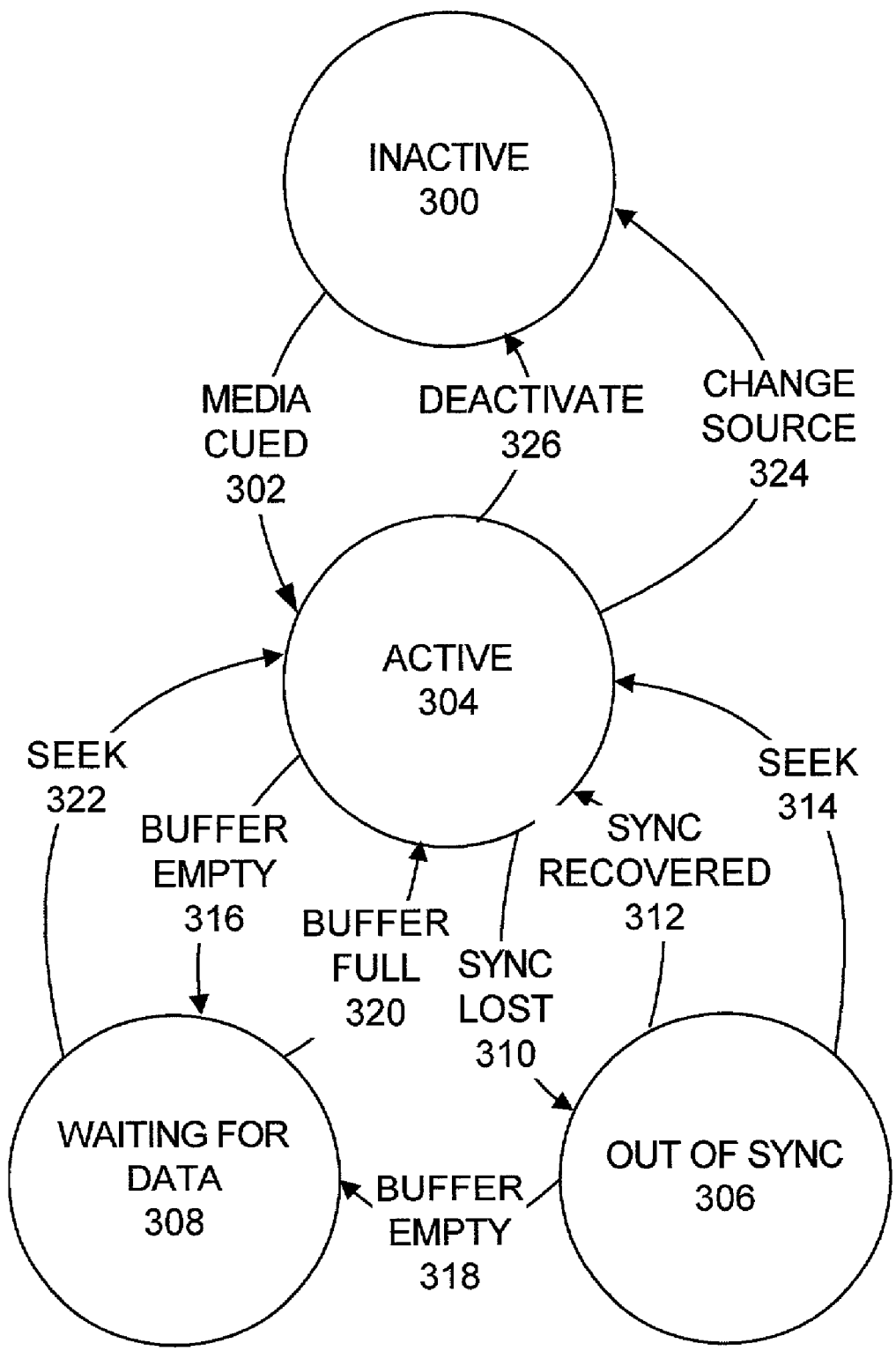
FIG. 3 is a state transition diagram for a player-hosting peer in accordance with various inventive principles.
Figure 4:
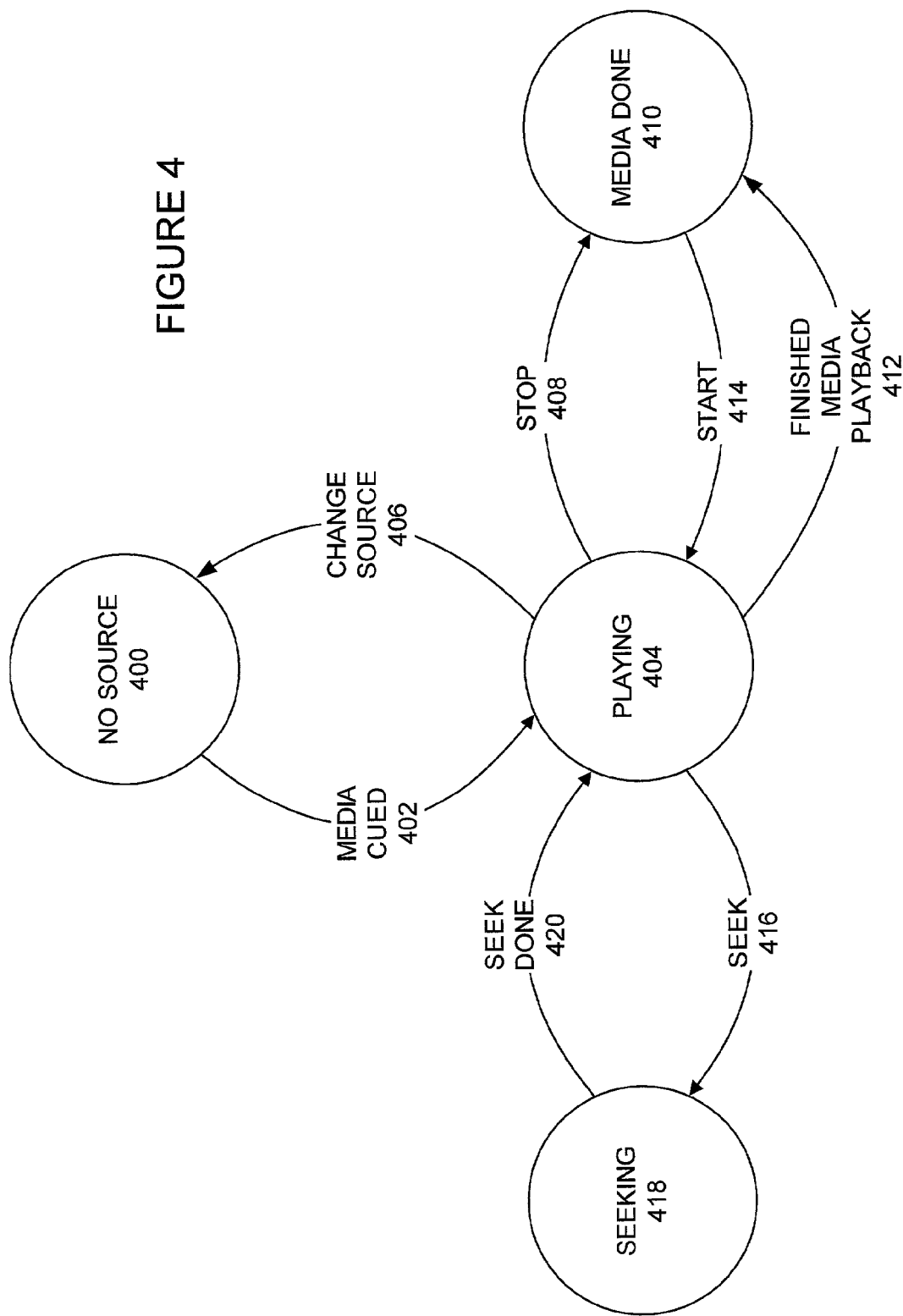
FIG. 4 is a state transition diagram for a generic media player in accordance with various inventive principles.

FIG. 3 is a simplified state transition diagram showing example states through which the player-hosting peer 200 may transition. FIG. 4 is a simplified state transition diagram showing examples states through which the player 204 may transition. The state of the player-hosting peer typically restricts the possible states that the player can be in. FIG. 5 is a table that shows a typical correspondence between certain peer and player states.

Player Peer State Transition Diagram

The arcs connecting the state nodes shown in FIG. 3 represent events or commands issued by either the hosting browser 202 or the player 204. The peer 200 acts as a component that negotiates interaction between the browser and the player. The peer abstracts behavior that is specific to neither the player nor the browser. FIG. 6 is a table containing short descriptions of various events and/or commands that may trigger state changes in the peer.

Referring to FIGS. 3 and 4, various example operations and state transitions will be described. It will be apparent that other suitable operations and state transitions could also occur without departing from the scope of the invention. In accordance with certain inventive principles, the peer 200 is initialized in its Inactive state 300. After finishing its initialization, the peer may instantiate the player 204. After the player is instantiated, the player may be initialized in the No Source state 400.

The peer may perform a Media Cued transition 302 from the Inactive state 300 to the Active state 304 as follows: the peer 200 may wait in the Inactive state 300 for the player 204 to build any desired infrastructures. When the browser 202 sets a source, the player 204 may first cue the media to be played. Media cueing may include source connection operations performed before the media source becomes accessible. Upon media cue completion, the player may make a Media Cued transition 402 from the No Source state 400 to the Playing state 404. The player will typically be ready to playback media from the Playing state 404. The peer's Media Cued transition 302 to the Active state 304 preferably occurs as a result of the player's Media Cued transition 402 to the Playing state 404.

From the Active state 304 the player peer 200 may transition to any of the following states: Out of Sync 306, Waiting for Data 308, and Inactive 300.

When the player 204 is hosted with a synchronized hosting scheme, the Out of Sync state 306 may be entered if the player 204 loses timing synchronization with its hosting peer 200. Synchronization loss is detected by the peer 200, which also notifies the player 204 of the peer's Sync Lost transition 310 to the Out of Sync state 306. The hosting peer 200 may try to resolve the "out of sync condition" by using heuristics applied to both its own timing and the player's timing. If the player's peer 200 detects that resynchronization has occurred, the peer performs a Sync Recovered transition 312 from the Out of Sync state 306 back to the Active state 304. A Seek transition 314 from the Out of Sync state 306 to the Active state 304 may also occur as the result of an attempt to seek the media.

The player peer 200 may perform Buffer Empty transitions 316 and 318 from the Active and Out of Sync states 304 and 306, respectively, to the Waiting for Data state 308 when the player 204 can no longer playback media due to a buffer empty problem or any other media delivery problem. Buffer Empty transition 316 from the Active state 304 to the Waiting for Data state 308 may be initiated by the player 204 and may be signaled to the player-hosting peer 200. When the player 204 can no longer play due to an insufficient amount of buffered data, synchronization can no longer be recovered until the player has enough data to resume playback. When sufficient data is available for the player to continue playback, the player peer 200 may perform a Buffer Full transition 320 from the Waiting for Data state 308 back to the Active state 304. While the player-hosting peer 200 is in the Waiting for Data state 308, a seek command from the browser 202 to the player-hosting peer 200, will result in a Seek transition 322 to the Active state 304. Such a Seek transition 322 may be performed when a timing constraint affecting sync between the player-hosting peer 200 and the player 204 exists. Following such a Seek transition 322, if the player has insufficient buffered data, a Buffer Empty transition 316 is performed from the Active state 304 back to the Waiting for Data state 308. Upon buffering of a sufficient amount of data, a Buffer Full transition 320 is performed from the Waiting for Data state 308 to the Active state 304.

If the player source is changed, the new media source typically needs to be cued before playback can resume. Under such a scenario, the peer 200 may perform a Change Source transition 324 from the Active state 304 to the Inactive state 300, and the player 204 may perform a Change Source transition 406 from the Playing state 404 to the No Source state 400. The peer 200 may perform a Deactivate transition 326 from the Active state 304 to the Inactive state 300 when the player should be shutdown and removed. The browser may initiate such a Deactivate transition.

Player State Transition Diagram

After creation and initialisation of the player 204, the player will typically start in the No Source state 400. Upon successful completion of media cueing, which occurs after a media source is set on the player, the player performs a Media Cued transition 402 from the No Source state 400 to the Playing state 404. In the Playing state, the player may be either running or paused. Setting a media source on the player will typically initiate a Change Source transition 406 to the No Source state 400 from the Playing state 404.

The player 204 may perform a Stop transition 408 from the Playing state 404 to the Media Done state 410 upon receiving a stop command from the player peer 200. Similarly, the player 204 may perform a Finished Media Playback transition 412 from the Playing state 404 to the Media Done state 410 upon playing particular content to the end of that content. A rendering media player may use the Media Done state 410 for rendering a last frame of content. Upon receiving a start command from the player-hosting peer 200, the player 204 may perform a Start transition 414 from the Media Done 410 state to the Playing 404 state.

Upon receiving a seek command from the player-hosting peer 200, the player 204 may perform a Seek transition 416 from the Playing state 404 to the Seeking state 418. Upon completing the seek operation, the player 204 may perform a Seek Done transition 420 from the Seeking state 418 to the Playing state 404.

Integration or Proxy Layer

Figure 7:
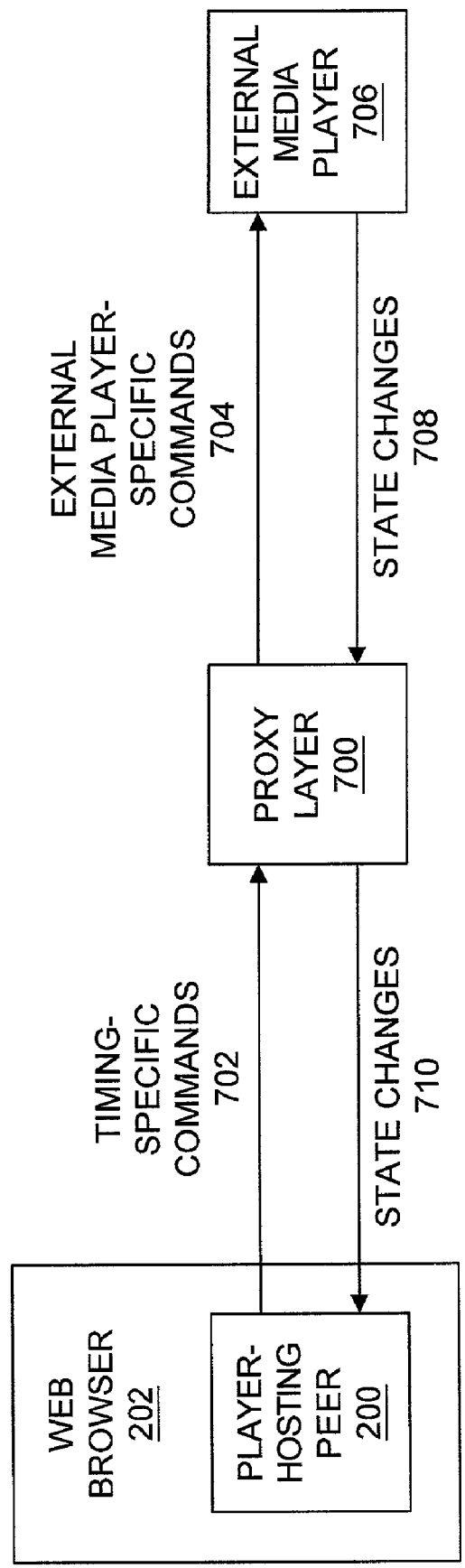
FIG. 7 is a simplified block diagram, similar to FIG. 2, showing a web browser, player-hosting peer, proxy layer, and an external media player in accordance with various inventive principles.

The proxy layer allows external media players to integrate seamlessly into a browser by implementing a relatively limited number of interfaces in accordance with various principles of the invention. The proxy layer extends the timing and synchronization functionality, discussed above, that exists in the context of a browser and native media player to the context of a browser and an external media player. Referring to FIG. 7, proxy layer 700 receives commands 702 from player hosting peer 200 and sends commands 704 to an external media player 706. Proxy layer 700 also receives state changes and/or other synchronization information 708 from the external media player 706 and sends state changes and/or other synchronization information 710 to the player-hosting peer 200.

According to various inventive principles, the commands 702 and 704 and the state changes 708 and 710 may be passed between the player hosting peer 200, proxy layer 700 and external media player 706 via the following interfaces:

ITIMEMediaPlayerSite: this interface is implemented by the hosting peer 200 and provides access to timing information available from the hosting peer;

ITIMEMediaPlayer: this interface is implemented by the external player 706 and contains the methods the player 706 implements for integrating with the browser 202;

ITIMEMediaPlayerControl: this interface is implemented by the external player 706 and allows the player 706 to declare itself an OLE compliant ActiveX control. Rendering media players preferably make such a declaration. If a player does not need rendering support, the player can disable ActiveX support on the peer side thereby reducing the use of CPU time and memory resources.

These interfaces advantageously shield developers of external media player from having to deal with synchronization details, which are handled by the player-hosting peer. Example interface definitions are set forth below. As will be apparent other suitable interface definitions could also be used without departing from the spirit and scope of the invention.

```
[
  object,
  uuid(bf0571ed-344f-4f58-82c7-7431ed0fd834),
  pointer_default(unique)
]
interface ITIMEMediaPlayerSite : IUnknown
{
  [propget, id(DISPID_TIMEMEDIAPLAYERSITE_TIMEELEMENT)]
  HRESULT timeElement([out, retval] ITIMEElement ** pElm);
  [propget, id(DISPID_TIMEMEDIAPLAYERSITE_TIMESTATE)]
  HRESULT timeState([out, retval] ITIMEState ** pState);
  [id(DISPID_TIMEMEDIAPLAYERSITE_REPORTERROR)]
  HRESULT reportError([in] HRESULT hr,
       [in] BSTR errorString);
}
[
  object,
  uuid(ea4a95be-acc9-4bf0-85a4-1bf3c51e431c),
  pointer_default(unique)
]
interface ITIMEMediaPlayer: IUnknown
{
  [id(DISPID_TIMEMEDIAPLAYER_INIT)]
  HRESULT Init(ITIMEMediaPlayerSite * mpsite);
  [id(DISPID_TIMEMEDIAPLAYER_DETACH)]
  HRESULT Detach();
  [id(DISPID_TIMEMEDIAPLAYER_BEGIN)]
  HRESULT begin();
  [id(DISPID_TIMEMEDIAPLAYER_END)]
  HRESULT end();
  [id(DISPID_TIMEMEDIAPLAYER_RESUME)]
```

-continued

```
    HRESULT resume();
    [id(DISPID_TIMEMEDIAPLAYER_PAUSE)]
    HRESULT pause();
    [id(DISPID_TIMEMEDIAPLAYER_REPEAT)]
    HRESULT repeat();
    [id(DISPID_TIMEMEDIAPLAYER_RESET)]
    HRESULT reset();
    [id(DISPID_TIMEMEDIAPLAYER_SEEK)]
    HRESULT seek([in] double time);
    // Properties - w
    [propput, id(DISPID_TIMEMEDIAPLAYER_SRC)]
    HRESULT src([in] BSTR url);
    [propput, id(DISPID_TIMEMEDIAPLAYER_CLIPBEGIN)]
    HRESULT clipBegin([in] VARIANT b);
    [propput, id(DISPID_TIMEMEDIAPLAYER_CLIPEND)]
    HRESULT clipEnd([in] VARIANT e);
    // Properties - r/o
    [propget, id(DISPID_TIMEMEDIAPLAYER_ABSTRACT)]
    HRESULT abstract([out, retval] BSTR *abs);
    [propget, id(DISPID_TIMEMEDIAPLAYER_AUTHOR)]
    HRESULT author([out, retval] BSTR *auth);
    [propget, id(DISPID_TIMEMEDIAPLAYER_CANPAUSE)]
    HRESULT canPause([retval, out] VARIANT_BOOL * b);
    [propget, id(DISPID_TIMEMEDIAPLAYER_CANSEEK)]
    HRESULT canSeek([retval, out] VARIANT_BOOL * b);
    [propget, id(DISPID_TIMEMEDIAPLAYER_CLIPDUR)]
    HRESULT clipDur([out, retval] double * dur);
    [propget, id(DISPID_TIMEMEDIAPLAYER_COPYRIGHT)]
    HRESULT copyright([out, retval] BSTR *cpyrght);
    [propget, id(DISPID_TIMEMEDIAPLAYER_CURRTIME)]
    HRESULT currTime([out, retval] double * time);
    [propget, id(DISPID_TIMEMEDIAPLAYER_CUSTOM_OBJECT)]
    HRESULT customObject([out, retval] IDispatch ** disp);
    [propget, id(DISPID_TIMEMEDIAPLAYER_HASAUDIO)]
    HRESULT hasAudio([retval, out] VARIANT_BOOL * b);
    [propget, id(DISPID_TIMEMEDIAPLAYER_HASVISUAL)]
    HRESULT hasVisual([retval, out] VARIANT_BOOL * b);
    [propget, id(DISPID_TIMEMEDIAPLAYER_MEDIADUR)]
    HRESULT mediaDur([out, retval] double *dur);
    [propget, id(DISPID_TIMEMEDIAPLAYER_MEDIAHEIGHT)]
    HRESULT mediaHeight([out, retval] long *height);
    [propget, id(DISPID_TIMEMEDIAPLAYER_MEDIAWIDTH)]
    HRESULT mediaWidth([out, retval] long *width);
    [propget, id(DISPID_TIMEMEDIAPLAYER_PLAYLIST)]
    HRESULT playList([out, retval] ITIMEPlayList** pPlayList);
    [propget, id(DISPID_TIMEMEDIAPLAYER_RATING)]
    HRESULT rating([out, retval] BSTR *rate);
    [propget, id(DISPID_TIMEMEDIAPLAYER_STATE)]
    HRESULT state([out, retval] TimeState * ts);
    [propget, id(DISPID_TIMEMEDIAPLAYER_TITLE)]
    HRESULT title([out, retval] BSTR *name);
};
[
    object,
    uuid(897a99e7-f386-45c8-b51b-3a25bbcbba69),
    pointer_default(unique)
]
interface ITIMEMediaPlayerControl : IUnknown
{
    [id(DISPID_TIMEMEDIAPLAYERCONTROL_GETCONTROL)]
    HRESULT getControl(IUnknown ** control);
}
```

In accordance with various inventive principles, a web content author may use different embeddable playback components, each having different notions of time, within a single document at the author's discretion. According to certain inventive aspects, an infrastructure, also referred to as a proxy layer or integration layer, is provided that underlies, and allows extensibility of, various elements set forth in the working draft of the SMIL 2.0 Timing and Synchronization Module (Exhibit A). The SMIL 2.0 Timing and Synchronization Module is part of the working draft of the SMIL 2.0 specification, which is hundreds of pages long.

For instance, video content may play with a browser's native media player, or a document author may specify a particular player to be instantiated. If the specified player implements the necessary interfaces, in accordance with the teachings of this invention, then that player, or any other player that implements the appropriate interfaces, will simply integrate with the browser. In this way, various disparate players, for various, possibly disparate, media, may be seamlessly integrated with various browsers in accordance with the teachings of this invention. In other words, any generic player that implements a set of interfaces in accordance with various principles of the invention will integrate seamlessly with a browser and will be able to exchange timing and synchronization information with other system components, such as a browser, and/or other timed content.

DirectMusic, for instance, is a technology that allows for play back of music specified essentially in the form of written sheet music. So, instead of sampled music like ".wav" or analogous formats, the notes may be written and orchestration of various instruments and the like may be specified. A player that takes DirectMusic as a source may be used along with a DirectMusic source file thereby allowing playback of DirectMusic within a web browser.

The DirectMusic time model is completely different than the typical simple duration model, which starts at time zero and progresses in standard units of time, such as seconds. DirectMusic may specify a cadence, a style of music, and the like. In accordance with the teachings of this invention, an integration or proxy layer may be used to provide a reasonable mapping so that authors who want to use DirectMusic to augment their web pages are able to do so without having to ripple out a radically different timing universe to the world. Significantly, the integration or proxy layer allows a defined playback mechanism to coexist and also synchronize with more traditional textual types of media.

CONCLUDING REMARKS

What has been described above is merely illustrative of the application of the principles of the present invention. Those skilled in the art can implement other systems and methods without departing from the spirit and scope of the present invention. Any of the methods of the invention can be implemented in software that can be stored on computer disks or other computer-readable media. No claim should be interpreted to be in means plus function format.

We claim:

1. A system comprising:
  one or more computer-readable media embodying:
    a web browser which does not include a media player configured to provide timing representations to third party media players;
    a plurality of third party media players, each of the plurality of third party media players including a first interface for object management and a second interface for exchanging timing and synchronization information with the web browser; and
    a player-hosting peer within the web browser for negotiating a playback state and a rendering status between the web browser and each of the plurality of third party media players by exchanging, without user input, command and state change information between the web browser and each of the plurality of third party media players, the player-hosting peer coordinating the web browser and the plurality of third party media players, each having different notions of time, while displaying multiple disparate types of content that are incorporated into a single document, wherein the player-hosting peer transitions through states including inactive, active, waiting for data, and out of sync.

2. The system of claim 1 wherein the player-hosting peer issues commands to each of the plurality of third party media players.

3. The system of claim 2 wherein each of the plurality of third party media players notifies the player-hosting peer of state changes of the related media player.

4. The system of claim 1 wherein the second interface includes a playback state and a current playback time passed from each of the plurality of third party media players to the web browser.

5. The system of claim 4 wherein each of the plurality of third party media players and the player-hosting peer jointly maintain the playing state and the current playback time.

6. The system of claim 1 wherein the second interface includes web browser time information and/or application time information passed from the web browser to each of the plurality of third party media players.

7. The system of claim 1 wherein the player-hosting peer transitions from the inactive state to the active state upon receiving a media cued notification from at least one of the plurality of third party media players.

8. The system as in claim 7 wherein the player-hosting peer transitions from the active state to the inactive state upon receiving a deactivate command from the web browser.

9. The system as in claim 7 wherein the player-hosting peer transitions from the active state to the inactive state upon receiving a change source command from the web browser.

10. The system as in claim 7 wherein the player-hosting peer transitions from the active state to the waiting for data state upon receiving a buffer empty notification from at least one of the plurality of media players.

11. The system as in claim 10 wherein the player-hosting peer transitions from the waiting for data state to the active state upon receiving a buffer full notification from at least one of the plurality of third party media players.

12. The system as in claim 10 wherein the player-hosting peer transitions from the waiting for data state to the active state upon receiving a seek command from the web browser.

13. The system as in claim 7 wherein the player-hosting peer transitions from the active state to the out of sync state upon detecting a sync lost condition.

14. The system as in claim 13 wherein the player-hosting peer transitions from the out of sync state to the active state upon detecting a sync recovered condition.

15. The system as in claim 13 wherein the player-hosting peer transitions from the out of sync state to the active state upon receiving a seek command from the web browser.

16. The system as in claim 1 wherein each of the plurality of third party media players transitions through states including no source, playing, seeking, and media done.

17. The system as in claim 16 wherein each of the plurality of third party media players transitions from the no source state to the playing state upon completion of media cueing.

18. The system as in claim 17 wherein each of the plurality of third party media players transitions from the playing state to the no source state upon receiving a change source command from the player-hosting peer.

19. The system as in claim 17 wherein each of the plurality of third party media players transitions from the playing state to the seeking state upon receiving a seek command from the player-hosting peer.

20. The system as in claim 19 wherein each of the plurality of third party media players transitions from the seeking state to the playing state upon completion of a seek operation.

21. The system as in claim 17 wherein each of the plurality of third party media players transitions from the playing state to the media done state upon receiving a stop command from the player-hosting peer.

22. The system as in claim 21 wherein each of the plurality of third party media players transitions from the media done state to the playing state upon receiving a start command from the player-hosting peer.

23. The system as in claim 17 wherein each of the plurality of third party media players transitions from the playing state to the media done state upon finishing media playback.

24. The system as in claim 23 wherein each of the plurality of third party media players transitions from the media done state to the playing state upon receiving a start command from the player-hosting peer.

25. The system as in claim 1 wherein each of the plurality of third party media players notifies the player-hosting peer when media is ready for playback.

26. The system as in claim 1 wherein each of the plurality of third party media players prepares for destruction upon receiving a deactivate command from the player-hosting peer.

27. The system as in claim 1 wherein each of the plurality of third party media players changes from a first media source to a second media source upon receiving a change media source command from the player-hosting peer.

28. The system as in claim 1 wherein each of the plurality of third party media players notifies the player-hosting peer of a buffer empty condition when media playback can not continue due to a media delivery problem.

29. The system as in claim 28 wherein each of the plurality of third party media players notifies the player-hosting peer of a buffer full condition when the media delivery problem has been resolved and media playback can continue.

30. The system as in claim 1 wherein the player-hosting peer notifies each of the plurality of third party media players that the media playback time is out of sync with time information maintained by the player-hosting peer.

31. The system as in claim 30 wherein the player-hosting peer notifies each of the plurality of third party media players that synchronization has been regained between the media playback time and time information maintained by the player-hosting peer.

32. The system as in claim 1 wherein the player-hosting peer passes commands from the web browser to each of the plurality of third party media players, the commands including play, stop, pause, resume, and seek.

33. The system as in claim 1 wherein the player-hosting peer passes a seek command from the web browser to each of the plurality of third party media players to indicate that the player should jump to a specific time offset into media playback.

34. The system as in claim 1 wherein the web browser is operating in a television set top environment.

35. The system as in claim 1 wherein the other content includes advertising or other commercial content synchronized with at least one portion of the media content.

36. The system as in claim 1 further comprising a proxy layer for passing synchronization information or commands or both synchronization information and commands between the browser and an external media player.

37. The system as in claim 1 wherein the player-hosting peer implements an interface for providing access to timing information from the player-hosting peer.

38. A method comprising the steps of:
providing, by a web browser which does not include a media player, a timing representation to each of a plurality of third party media players;

providing a first media player interface for object management and a second media player interface for exchanging timing and synchronization information with the web browser;

providing a player-hosting peer within the web browser for negotiating a playback state and a rendering status between the web browser and each of the plurality of third party media players, wherein the player-hosting peer transitions through states including inactive, active, waiting for data, and out of sync;

issuing commands from the player-hosting peer to each of the plurality of third party media players, the commands being directed to media player operations other than, and in addition to, instantiation of the plurality of third party media players, issuing commands including coordination command among the web browser and the plurality of third party media players, each having different notions of time, while displaying multiple disparate types of content that are incorporated into a single document; and notifying the web browser of changes of the states of the plurality of third party media players.

39. The method of claim 38 wherein the second media player interface includes a playback state and a current playback time passed from each of the plurality of third party media players to the web browser.

40. The method of claim 39 wherein each of the plurality of third party media players and the web browser both maintain the playing state and the current playback time.

41. The method of claim 38 wherein the second media player interface includes the host computer time information passed from the browser to each of the plurality of third party media players.

42. The method of claim 38 wherein each of the plurality of third party media players notifies the player-hosting peer when media is ready for playback.

43. The method of claim 38 wherein each of the plurality of third party media players prepares for destruction upon receiving a deactivate command from the browser.

44. The method of claim 43 wherein the web browser notifies each of the plurality of third party media players that synchronization has been regained between the media playback time and time information maintained by the web browser.

45. The method of claim 38 wherein each of the plurality of third party media players changes from a first media source to a second media source upon receiving a change media source command from the browser.

46. The method of claim 38 wherein each of the plurality of third party media players notifies the web browser of a buffer empty condition when media playback can not continue due to a media delivery problem.

47. The method of claim 46 wherein each of the plurality of third party media players notifies the web browser of a buffer full condition when the media delivery problem has been resolved and media playback can continue.

48. The method of claim 38 wherein the browser notifies each of the plurality of third party media players that media playback time is out of sync with time information maintained by the web browser.

49. The method of claim 38 wherein the command passed from the web browser to each of the plurality of third party media players includes play, stop, pause, resume, and seek.

50. The method of claim 38 wherein the browser passes a seek command to each of the plurality of third party media players to indicate that the player should jump to a specific time offset into media playback.

51. The method of claim 38 wherein the other content includes advertising or other commercial content synchronized with at least one portion of the media content.

52. The method of claim 38 wherein at least one of the plurality of third party media players is external to the web browser.

53. The method of claim 38 wherein the step of providing a timing representation to each of the plurality of third party media players further comprises the step of implementing an interface to provide access to timing information from the web browser.

* * * * *